US011082255B1

(12) United States Patent
Mui et al.

(10) Patent No.: US 11,082,255 B1
(45) Date of Patent: Aug. 3, 2021

(54) METHOD AND AN APPARATUS FOR ESTABLISHING SECURE, LOW LATENCY, OPTIMIZED PATHS IN A WIDE AREA NETWORK

(71) Applicant: Hong Kong Applied Science And Technology Research Institute Company Limited, Shatin (HK)

(72) Inventors: Ka Ho Mui, Kowloon (HK); Wei Chen, Shatin (HK); Zhicheng Luo, Pak Shek Kok (HK); Liang Dong, Tseung Kwan O (HK)

(73) Assignee: Hong Kong Applied Science And Technology Research Institute Company Limited, Shatin (HK)

( * ) Notice: Subject to any disclaimer, the term of this patent is extended or adjusted under 35 U.S.C. 154(b) by 0 days.

(21) Appl. No.: 17/020,932

(22) Filed: Sep. 15, 2020

(51) Int. Cl.
*H04L 12/46* (2006.01)
*H04L 12/721* (2013.01)
(Continued)

(52) U.S. Cl.
CPC .......... *H04L 12/4633* (2013.01); *H04L 45/70* (2013.01); *H04L 63/029* (2013.01);
(Continued)

(58) Field of Classification Search
CPC ......... H04L 12/00; H04L 12/28; H04L 12/46; H04L 12/4633; H04L 45/00; H04L 45/70;
(Continued)

(56) References Cited

U.S. PATENT DOCUMENTS 9,450,817 B1 9/2016 Bahadur et al.
9,722,815 B2 8/2017 Mukundan et al.
(Continued)

FOREIGN PATENT DOCUMENTS

CN 101262429 A 9/2008
CN 103067290 A 4/2013
(Continued)

OTHER PUBLICATIONS

International Search Report for PCT/CN2020/11618; completed May 25, 2021; dated Jun. 17, 2021.
Written Opinion for PCT/CN2020/116181; dated Jun. 10, 2021.

*Primary Examiner* — Boris D Grijalva Lobos

(57) ABSTRACT

A method and apparatus for transporting packets over a wide area network (WAN) in a communications network are provided where the WAN comprises a plurality of interconnected nodes including at least a first communication node, a second communication node and a WAN controller node. The method comprises establishing virtual private network (VPN) tunnel connections on communication links between some or all of the communication nodes comprising the WAN, using a non-stream-oriented transport layer protocol to establish a non-stream-oriented association for each VPN tunnel connection, and, on receiving a packet connection from a source device at said first communication node, encapsulating packets from said packet connection into one or more non-stream-oriented associations between the first communication node and the second communication node to thereby transport said packets from the source device to the second communication node. The WAN controller node communicates to the first communication node a selection of links or routes for packet transport to the second communication node. The first communication node selects the one or more non-stream-oriented associations for encapsulating packets into from a plurality of non-stream-oriented asso- (Continued)

ciations established on the links or routes communicated to said first node by the WAN controller node.

21 Claims, 6 Drawing Sheets

(51) Int. Cl.
　　*H04L 29/06*　　　(2006.01)
　　*H04L 29/08*　　　(2006.01)
(52) U.S. Cl.
　　CPC ........ *H04L 63/0272* (2013.01); *H04L 69/326* (2013.01); *H04L 2212/00* (2013.01)

(58) Field of Classification Search
　　CPC ..... H04L 63/00; H04L 63/02; H04L 63/0272; H04L 63/029; H04L 69/00; H04L 69/30; H04L 69/32; H04L 69/322; H04L 69/325–326; H04L 2212/00
　　See application file for complete search history.

(56) References Cited

U.S. PATENT DOCUMENTS

| | | | |
|---|---|---|---|
| 10,021,594 B2 | 7/2018 | Hecht et al. | |
| 10,122,829 B2 | 11/2018 | Saavedra | |
| 2004/0264671 A1* | 12/2004 | Lamberton | H04L 12/66 379/221.03 |
| 2008/0205445 A1* | 8/2008 | Kumar | H04L 69/16 370/469 |
| 2009/0034416 A1* | 2/2009 | Baron | H04L 69/161 370/235 |
| 2009/0052466 A1* | 2/2009 | Khalid | H04L 45/122 370/467 |
| 2010/0166153 A1* | 7/2010 | Guleria | H04L 65/1069 379/45 |
| 2015/0188887 A1* | 7/2015 | Thomas | H04L 12/4641 713/153 |
| 2016/0308765 A1 | 10/2016 | Le et al. | |
| 2021/0075716 A1* | 3/2021 | Hsu | H04L 45/74 |

FOREIGN PATENT DOCUMENTS

| | | |
|---|---|---|
| CN | 107810619 A | 3/2018 |
| EP | 1333642 A2 | 6/2003 |

* cited by examiner

METHOD AND AN APPARATUS FOR ESTABLISHING SECURE, LOW LATENCY, OPTIMIZED PATHS IN A WIDE AREA NETWORK

FIELD OF THE INVENTION

The invention relates to a method and an apparatus for establishing secure, low latency, optimized paths in a wide area network (WAN) and more particularly, but not exclusively to reducing connection setup time in the WAN by, for example, reducing Transmission Control Protocol (TCP) connection setup time over high latency communication links in the WAN.

BACKGROUND OF THE INVENTION

In communication networks, latency is a measure of delay. Latency may comprise a measure of the delay in setting-up a connection across a communication network or between specific nodes in said network. Latency may also comprise a measure of the delay in transmitting data to its destination in the network. Latency is normally measured as a round trip delay, although this is not necessarily always the case. Latency can also be considered as a measure of the responsiveness of the network to the extent it reflects the ability of the network to efficiently setup connections and/or to efficiently carry data.

In a typical WAN deployment of a global organization or a multinational corporation, organization sites are often located around the globe and may involve long geographical distances therebetween. In such cases, the organization sites may require long distance communication links which may exhibit high latency. Often, there are multiple communication links interconnecting the organization sites. Such communication links may, for example, comprise, but not be restricted to, leased lines, Multi-Protocol Label Switching (MPLS) network links, private network links, public network links, satellite system links, and internet links. A significant amount of handshake signal latency may be encountered with long distance links or connections. For example, in the case of TCP, long distance links or connections can result in a high latency three-way handshake for TCP connection setup and consequently high latency before the first data is sent or delivered across such a connection. Furthermore, the link bandwidth utilization rate is typically low because of a lack of dynamic management on link selection for different types of network traffic. Consequently, due to the high latency and low link bandwidth utilization rate, packet throughput between sites in a WAN network may be significantly reduced.

U.S. Pat. No. 9,722,815 discloses an edge-gateway multipath method including the step of providing an edge device in a local network communicatively coupled with a cloud-computing service in a cloud-computing network. A set of WAN links connected to the edge device are automatically detected. The WAN links are automatically measured without the need for an external router. The edge device is communicatively coupled with a central configuration point in the cloud-computing network. The method further includes the step of downloading, from the central configuration point, an enterprise-specific configuration data into the edge device. The enterprise-specific configuration data includes the gateway information. The edge device is communicatively coupled with a gateway in the cloud-computing network. The communicatively coupling of the edge device with the gateway includes a multipath (MP) protocol. In effect, a centralized configuration point in the cloud server selects paths based on the available bandwidth on each path.

EP1333642 discloses an approach for supporting security in a communications network. A network device includes a security peer that establishes a secure tunnel over a data network (e.g., satellite network) for transport of encrypted traffic. The device also includes a performance peer for establishing a connection supported by the secure tunnel.

U.S. Ser. No. 10/122,829 discloses a network system for improving network communication performance. The system includes at least one client site network component implemented at least at a first client site. The client site network component bonds or aggregates one or more diverse network connections so as to configure a bonded connection that has increased throughput. The system includes at least one network server component configured to connect to the client site network component using the bonded connection. The network server component automatically terminates the bonded connection and passes data traffic to the at least one network. The system includes a virtual control plane interface at the at least one network server component and a cloud network controller configured to manage the data traffic. The cloud network controller is operable to configure the virtual control plane interface to provide a priority queue for the data traffic from or to a plurality of client site network components.

U.S. Pat. No. 7,680,051 discloses a system for pre-configuring a Stream Control Transmission Protocol (SCTP) association, receiving a TCP packet in a network device, where the TCP packet is intended for a destination node, and encapsulating the TCP packet into an SCTP payload for transmitting the SCTP payload across a WAN. However, when minimizing latency, it is desirable to avoid data loss caused by improperly injecting too much traffic exceeding a WAN link's capacity or exceeding its quality of service (QoS) policy.

U.S. Pat. No. 9,450,817 discloses an extensible software defined network (SDN) controller that provides an application-aware framework that enable a variety of different user applications to communicate with the controller and that allows the controller to automatically configure devices in a network based on the needs of the applications. Thus, the SDN controller automatically configures devices in the network based on the needs of the applications.

U.S. Ser. No. 10/021,594 discloses a satellite communication system configured to establish multiple different tunnels between a first satellite modem and a second satellite modem in accordance with a protocol. The first satellite modem may receive a packet via a tunnel established in accordance with a different protocol. It may then determine an endpoint identifier corresponding to the tunnel based on information from one or more headers included in the packet, identify one of the multiple different tunnels that corresponds to the tunnel, generate a corresponding packet omitting at least a portion of the information from the one or more headers and comprising at least a portion of data included in a payload of the packet and an information block comprising a tunnel index corresponding to the identified one of the multiple different tunnels, and transmit the corresponding packet to the second satellite modem via the identified one of the multiple different tunnels. There is, however, no reduction in the TCP setup time or any reduction in the delay of sending a first data payload.

Thus, there remains a need for at least a method and apparatus which can improve the connection setup efficiency over communication links in a WAN and, more particularly, over long-distance communication links in a WAN.

OBJECTS OF THE INVENTION

An object of the invention is to mitigate or obviate to some degree one or more problems associated with known methods of using a high latency network connection in a WAN.

The above object is met by the combination of features of the main claims; the sub-claims disclose further advantageous embodiments of the invention.

Another object of the invention is to mitigate or obviate to some degree one or more problems associated with the connection setup efficiency over communication links in a WAN and, more particularly, over long-distance communication links in a WAN.

Another object of the invention is to reduce the latency of TCP connection setup in a WAN.

Another object of the invention is to improve path optimization in a WAN.

Another object of the invention is to increase packet transmission throughput in a WAN.

Another object of the invention is to improve network security in a WAN.

One skilled in the art will derive from the following description other objects of the invention. Therefore, the foregoing statements of object are not exhaustive and serve merely to illustrate some of the many objects of the present invention.

SUMMARY OF THE INVENTION

The invention relates to a method and an apparatus for establishing secure, low latency and/or optimized paths in a WAN.

In a first main aspect, the invention provides a method and apparatus for transporting packets over a wide area network (WAN) in a communications network where the WAN comprises a plurality of interconnected nodes including at least a first communication node, a second communication node and a WAN controller node. The method comprises establishing virtual private network (VPN) tunnel connections on communication links between some or all of the communication nodes, using a non-stream-oriented transport layer protocol to establish a non-stream-oriented association for each VPN tunnel connection, and, on receiving a packet connection from a source device at said first communication node, encapsulating packets from said packet connection into one or more non-stream-oriented associations between the first communication node and the second communication node to thereby transport said packets from the source device to the second communication node. The WAN controller node communicates to the first communication node a selection of links or routes for packet transport to the second communication node. The first communication node selects the one or more non-stream-oriented associations provided for encapsulating packets from a plurality of non-stream-oriented associations established on the links or routes communicated to said first node by the WAN controller node.

Preferably, the packet connection received at said first communication node from the source device comprises a stream-oriented packet connection and optionally a TCP packet connection. Preferably also, the non-stream-oriented transport layer protocol comprises a message-oriented transport layer protocol. Preferably further, the message-oriented transport layer protocol comprises a Stream Control Transmission Protocol (SCTP). Optionally, each SCTP association is encrypted in an Internet Protocol Security (IPSec) VPN tunnel.

In a second main aspect, the invention provides a node for a WAN in a communications network, the WAN comprising a plurality of interconnected nodes in the communications network. The node includes a VPN module configured to establish VPN tunnel connections on communication links between said node and some or all of the other nodes comprising the WAN. The node also includes a non-stream-oriented transport layer protocol module configured to establish a non-stream-oriented association for each VPN tunnel connection at said node. Also included is a stream-oriented transport layer protocol proxy module configured to, on receiving at said node a stream-oriented connection from a source device, encapsulate packets from said stream-oriented connection into one or more non-stream-oriented associations between said node and a destination node to thereby transport said packets from the source device to the destination node. A remote procedure call (RPC) module is configured to receive from a WAN controller node a selection of links or routes for packet transport from said node to other nodes comprising the WAN. The node is arranged such that the stream-oriented transport layer protocol proxy module selects the one or more non-stream-oriented associations provided for encapsulating packets from a plurality of non-stream-oriented associations established on the links or routes communicated to said first node by the WAN controller node.

In a third main aspect, the invention provides a method comprising pre-configuring a plurality of non-TCP associations, the non-TCP comprising a message-oriented transport layer protocol and optionally comprising SCTP, receiving TCP packets from a network device, the TCP packets being intended for a destination node or device, encapsulating the TCP packets into non-TCP payloads for one or more selected non-TCP associations; and transmitting the non-TCP payloads across a WAN in one or more streams on the one or more selected non-TCP associations to the destination node or device, wherein the selected one or more non-TCP associations are selected based on one or more topological and/or one or more operational parameters of the WAN.

In a fourth main aspect, the invention provides a communication node comprising a non-stream-oriented transport layer protocol module for pre-configuring a plurality of non-TCP associations, the non-TCP comprising a message-oriented transport layer protocol and optionally comprising SCTP, a stream-oriented transport layer protocol proxy module for receiving TCP packets from a network device, the TCP packets being intended for a destination node or device, said stream-oriented transport layer protocol proxy module being configured to encapsulate the TCP packets into non-TCP payloads for one or more non-TCP associations and to transmit the non-TCP payloads across a WAN in one or more streams on the one or more non-TCP associations to the destination node or device, wherein the stream-oriented transport layer protocol proxy module is configured to select one or more non-TCP associations established on a set of links or routes, said set of links or routes being selected based on one or more topological and/or one or more operational parameters of the WAN.

In a fifth main aspect, the invention provides a method of transporting packets over a WAN in a communications network, the WAN comprising a plurality of interconnected communication nodes including at least a first communication node, a second communication node and a WAN controller node, the method comprising the steps at the WAN controller node of receiving information from each of the first and second communication nodes about one or more topological and/or one or more operational parameters of the WAN, processing said received information to determine for each of said first and second communication nodes a respective selection of VPN tunnel connections already established on links or routes connecting said first and second communication nodes, each of said VPN tunnel connections already having a non-stream-oriented association established thereon for encapsulating packets from a stream-oriented packet connection, and sending said respective selections of VPN tunnel connections to said first and second communication nodes.

In a sixth main aspect, the invention provides a WAN controller node comprising a plurality of interconnected communication nodes including at least a first communication node and a second communication node, the WAN controller node comprising a RPC module for receiving information from each of the first and second communication nodes about one or more topological and/or one or more operational parameters of the WAN, and a processor for processing said received information to determine for each of said first and second communication nodes a respective selection of VPN tunnel connections already established on links or routes connecting said first and second communication nodes, each of said VPN tunnel connections already having a non-stream-oriented association established thereon for encapsulating packets from a stream-oriented packet connection.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
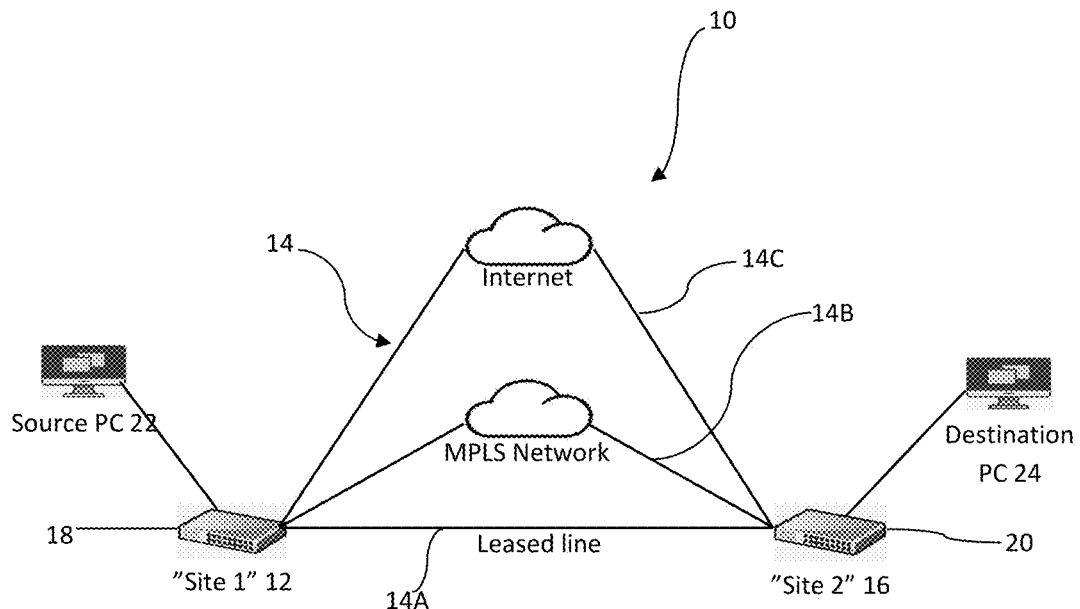
FIG. 1 is a schematic diagram of a prior art WAN configuration.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention will be described with respect to a wireless communications network by way of example only, but it will be understood that the principles of the invention as disclosed herein are equally applicable to any type of communications network having one or more high latency network connections whether of a legacy network connection type or specifically of a high latency backhaul network connection type such as, for example, a satellite network connection or a transcontinental fiber network connection.

Referring to FIG. 1 by way of reference, shown is a simplified conventional configuration of a WAN 10 for a global organization such as a multinational corporation. The WAN 10 comprises a first organization site "site 1" 12 connected by multiple communication links 14 to a second organization site "site 2" 16. The organization sites 12, 16 may be geographically separated by a long distance and may even be located in different countries. In this example, the first site 12 is located in Hong Kong and the second site 16 is located in San Francisco.

Although not shown, each of the sites 12, 16 may comprise multiple communication nodes including a hub-site node and branch-site nodes. At the sites 12, 16, the hub-site nodes 18, 20 provide gateways to the communication links 14 to other communication nodes at their sites 12, 16. The communication nodes including the hub-site nodes 18, 20 provide access to the communication links 14 to connected devices such as personal computers (PCs), exemplified in FIG. 1 by source PC 22 and destination PC 24, and to communication devices (not shown) as will be familiar to a person skilled in the art such as, for example, mobile phones and the like. It will be understood that the exemplary source PC 22 and destination PC 24 are not limited to the respective roles conveyed by their denotations in FIG. 1 but can operate both as sources and destinations. The denotation of roles in FIG. 1 is for ease of describing a typical operation of the conventionally configured WAN to illustrate deficiencies in said WAN. The other communication nodes at the sites 12, 16 may comprise any combination of servers, databases, switches, routers and the like. The communication links 14 may comprise, but not be restricted to, leased lines 14A, MPLS network connections 14B, and internet provisioned connections 14C.

Typically, the WAN 10 is configured as a TCP network whereby, when the source PC 22 wishes to transmit payload packets to the destination PC 24, it is necessary to first establish or setup a TCP connection between the source PC 22 and the destination PC 24. This requires a TCP three-way handshake process. The one-way TCP connection signal latency from Hong Kong to San Francisco for such a TCP three-way handshake process is typically about 164 ms. Consequently, the TCP three-way handshake process has a total latency of about 492 ms. As a consequence, the user experience will be poor due to the high latency TCP connection setup over the long-distance connection between the hub-site node 18 at site 1 and the hub-site node 20 at site 2. A further consequence is the delay in commencement of transmission of received payload packets from the hub-site node 18 to the hub-site node 20. Other consequences include that the internet provisioned connections 14C may not be fully utilized, the internet provisioned connections 14C may not be secure, the hub-site node 18 will continue to use the leased lines 14A and/or the MPLS network connections 14B even when they become congested, and the hub-site node 18 cannot dynamically switch between the communication links 14. Therefore, due to the high latency and low link utilization rate, TCP payload packet transmission between the first site 12 and the second site 16 may be significantly reduced.

The present invention as hereinafter described seeks to overcome the deficiencies in the conventional WAN configuration exemplified by FIG. 1 by, among other things, reducing the latency of connection setup across the WAN, improving path optimization, increasing payload packet throughput, and improving network security on any or all vulnerable WAN communication links, especially internet provisioned links.

Figure 2:
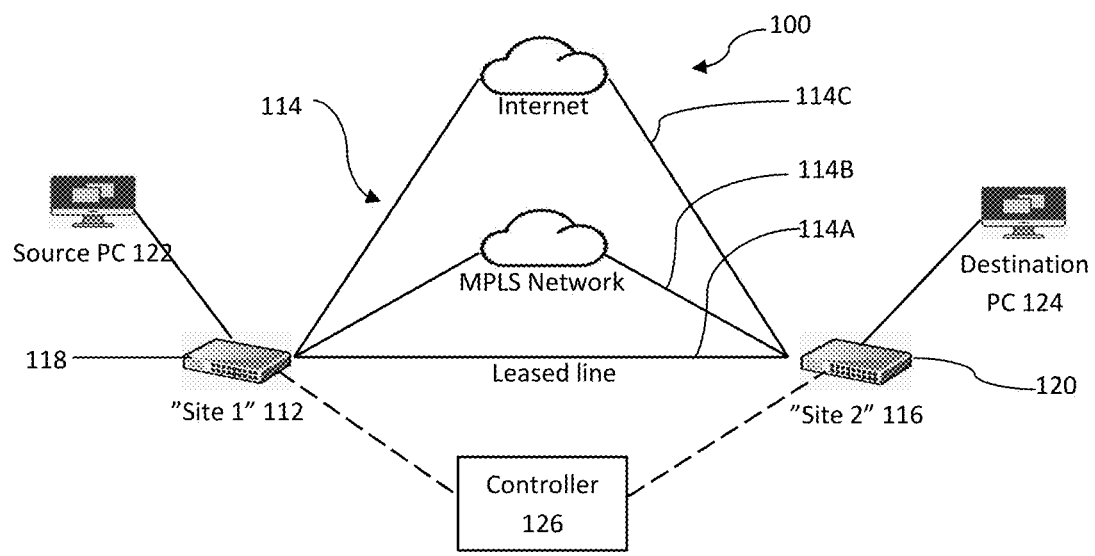
FIG. 2 is a schematic diagram of an embodiment of a WAN configuration in accordance with the invention.

Referring now to FIG. 2, shown is a simplified configuration of a WAN 100 in accordance with the invention. In the following description of the WAN 100, like numerals to those used in FIG. 1 will be utilized for like components or parts but preceded by the numeral "1". Any differences between like components or parts will be described below to highlight such differences.

In FIG. 2, it will be seen that the configuration of WAN 100 is largely the same as that for the conventional WAN of FIG. 1 save for the inclusion of a controller 126 and other differences in function that will be described below. WAN 100 comprises a first organization site "site 1" 112 connected by multiple communication links 114 to a second organization site "site 2" 116. Sites 112, 116 comprise multiple communication nodes including a hub-site node and branch-site nodes. The hub-site nodes 118, 120, which can be considered as comprising first and second communication nodes, provide gateways to the communication links 114 to other communication nodes (not shown) and the communication nodes including the hub-site nodes 118, 120 provide access to the communication links 114 to devices such as source PC 122 and destination PC 124 and to other communication devices (not shown). The communication links 114 may comprise, but not be restricted to, leased lines 114A, MPLS network connections 114B, and internet provisioned connections 114C. The controller 126 may not comprise a separate physical node but may be embodied through software in any suitable node of the WAN 100.

Figure 3:
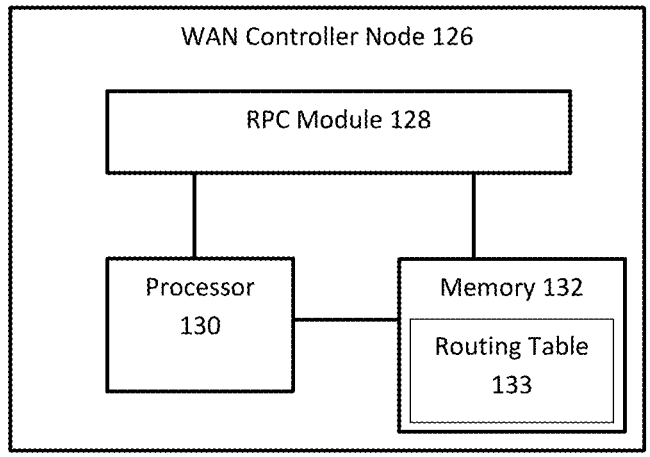
FIG. 3 is a block schematic diagram of an embodiment of a WAN controller node for a WAN configuration in accordance with the invention.

Referring to FIG. 3, the controller 126, also referred to herein as the "WAN controller node", comprises a remote procedure call (RPC) module 128 configured to receive information from each of the hub-site nodes 118, 120 and/or from other communication nodes at the sites 112, 116 about one or more topological and/or one or more operational parameters of the WAN 100. The one or more topological and/or one or more operational parameters of the WAN 100 may comprise any one or any combination of WAN communication node configuration data, WAN communication node status data, WAN link configuration data, WAN link status data, and WAN link quality data. The hub-site nodes 118, 120 and/or other communication nodes may be configured to provide the topological and/or the operational parameter data periodically to the controller 126. The controller 126 includes at least one processor 130 and at least one memory 132. The memory 132 may include a routing table 133. The controller 126 may comprise a distinct communication node in the WAN 100 communicatively connected to each of the hub-site nodes 118, 120 and/or other communication nodes or it may be embodied in any of said nodes or another WAN node. In other words, the controller 126 may be embodied in any suitable node in the WAN 100 provided that it can be communicatively connected to each of the nodes providing the topological and/or the operational parameter data.

Furthermore, the controller 126 may be implemented using logic circuits and/or executable code/machine readable instructions stored in the memory 132 for execution by the processor 130 to thereby perform functions as described hereinafter. For example, the executable code/machine readable instructions may be stored in one or more memories 132 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 132 may comprise processor-readable memories for use with respect to one or more processors 130 operable to execute code segments of the controller 126 and/or utilize data provided thereby to perform functions of the controller 126 as described herein. Additionally, or alternatively, the controller 126 may comprise one or more special purpose processors (e.g. application specific integrated circuit (ASIC), field programmable gate array (FPGA), graphics processing unit (GPU), and/or the like configured to perform functions of the controller 126 as described herein.

The processor 130 is configured to receive the topological and/or the operational parameter data and to process said data to determine for each of said first and second hub-site nodes 118, 120 a respective selection of VPN tunnel connections already established on the communication links or routes 114 where each of said VPN tunnel connections already have a non-stream-oriented transport layer protocol association established thereon for encapsulating packets from a stream-oriented transport layer protocol packet connection as will be described more fully below.

Figure 4:
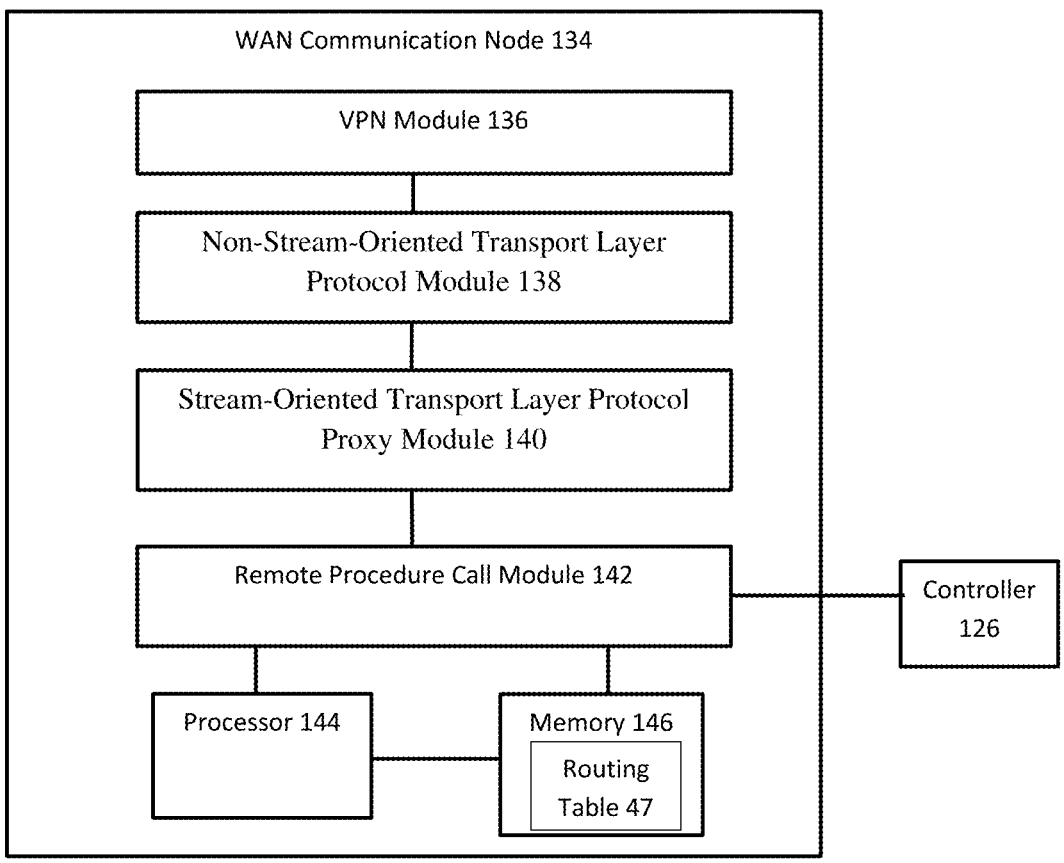
FIG. 4 is a block schematic diagram of an embodiment of a communications node for a WAN configuration in accordance with the invention.

Referring to FIG. 4, each hub-site node 118, 120 or any other suitable node at the sites 112, 116 may comprise a WAN communication node 134 for implementing the method in accordance with the invention. The WAN communication node 134 comprises a VPN module 136 configured to establish VPN tunnel connections 148 (FIG. 5) on the communication links 114 between said node 134 and some or all of the other nodes, e.g. hub-site node 120, comprising the WAN 100.

The WAN communication node 134 includes a non-stream-oriented transport layer protocol module 138 configured to establish a non-stream-oriented association 150 (FIG. 5) for each VPN tunnel connection 148 at said node 134. The non-stream-oriented transport layer protocol preferably comprises a message-oriented transport layer protocol. More preferably, the message-oriented transport layer protocol comprises SCTP. SCTP is message-oriented whereas TCP is stream-oriented or byte-oriented. SCTP can handle multiple simultaneous streams and multiplex streams whereas TCP can handle only a single stream of data per connection. Optionally, each SCTP association 150 is encrypted in an Internet Protocol Security (IPSec) VPN tunnel 148 or at least the VPN tunnels provisioned over a public network such as the internet are encrypted as IPSec tunnels 148.

The WAN communication node 134 also includes a stream-oriented transport layer protocol proxy module 140 which is configured to, on receiving at said node 134 a stream-oriented connection 152 (FIG. 5) from a source device such as the source PC 122, encapsulate packets from said stream-oriented connection 152 into one or more streams on a selected non-stream-oriented association 150 between said node 134 and a destination node to thereby transport said packets from the source PC 122 to the destination node. The stream-oriented connection 152 received at said WAN communication node 134 from the source PC 122 is preferably a TCP packet connection. The stream-oriented transport layer protocol proxy module 140 can be considered as comprising a TCP proxy module.

The WAN communication node 134 also includes an RPC module 142 configured to receive from the WAN controller node 126 a selection of links or routes for packet transport from said node 134 to other nodes 120.

The WAN communication node 134 is arranged such that the stream-oriented transport layer protocol proxy module 140 selects the non-stream-oriented association 150 for encapsulating packets from a plurality of non-stream-oriented associations already established on the links or routes 114 communicated to said node 134 by the WAN controller node 126.

The WAN communication node 134 also includes at least one processor 144 and at least one memory 146. The memory may include a routing table 147.

The WAN communication node 134 may be implemented using logic circuits and/or executable code/machine readable instructions stored in the memory 146 for execution by the processor 144 to thereby perform functions as described hereinafter. For example, the executable code/machine readable instructions may be stored in one or more memories 146 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 146 may comprise processor-readable memories for use with respect to one or more processors 144 operable to execute code segments of the WAN communication node 134 and/or utilize data provided thereby to perform functions of the WAN communication node 134 as described herein. Additionally, or alternatively, the WAN communication node 134 may comprise one or more special purpose processors (e.g. application specific integrated circuit (ASIC), field programmable gate array (FPGA), graphics processing unit (GPU), and/or the like configured to perform functions of the WAN communication node 134 as described herein.

Figure 5:
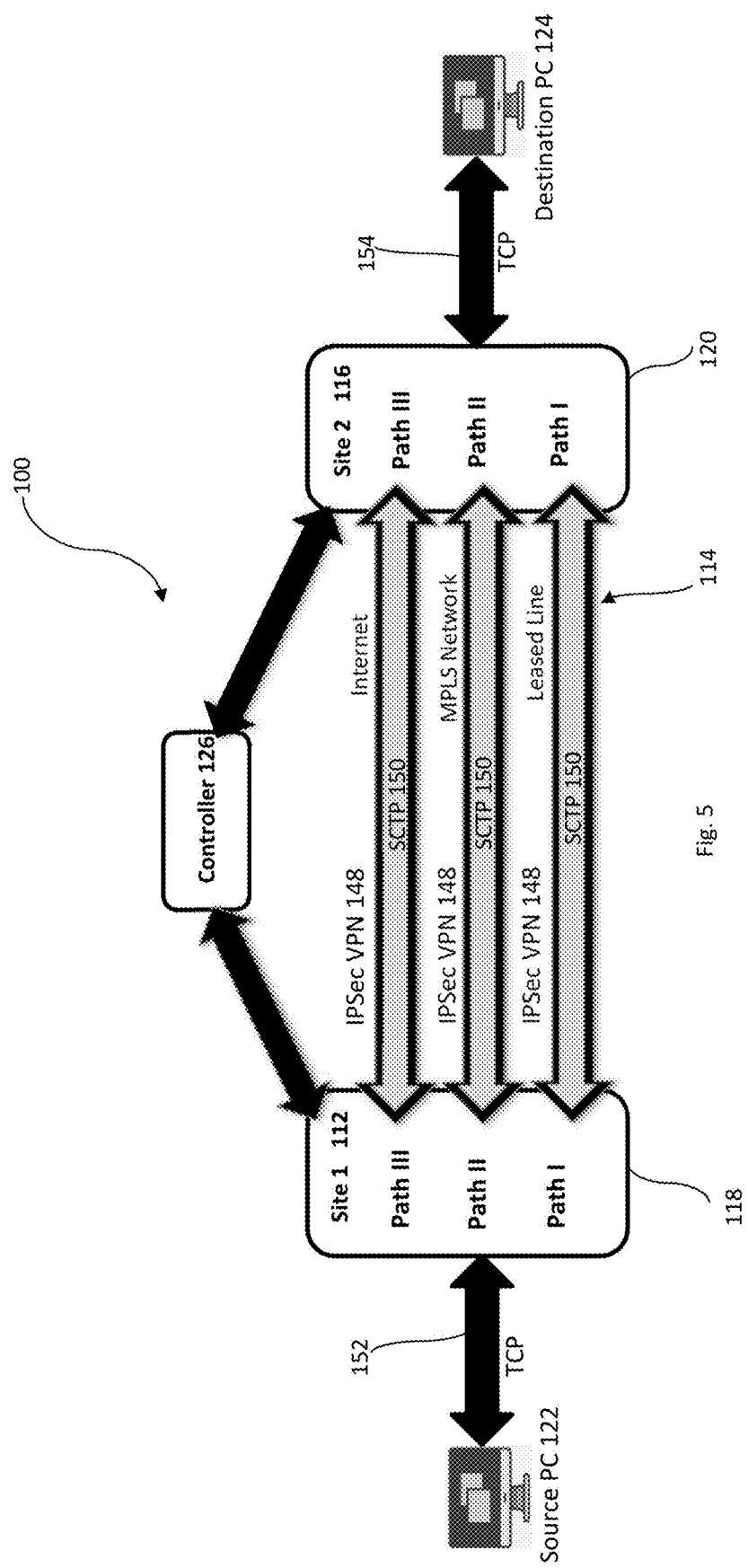
FIG. 5 is a schematic diagram of an embodiment of a WAN configuration in accordance with the invention illustrating the establishment of packet transmission paths.

Referring to FIG. 5, it can be seen that, in a preferred arrangement, the VPN module 136 establishes IPSec VPN tunnel connections 148 on the communication links 114 between some or all of the communication nodes, e.g. the first communication node 118 and the second communication node 120. Then, the non-stream-oriented transport layer protocol module 138 of the first communication node 118 preferably uses SCTP to establish an SCTP association or connection 150 for each IPSec VPN tunnel connection 148. The stream-oriented transport layer protocol proxy module 140, on receiving a TCP packet connection 152 from the source PC 122, encapsulates packets from said TCP packet connection 152 into one or more streams of a selected SCTP association 150 to thereby transport said packets from the source PC 122 to the second communication node 120, e.g. the hub-site node 120. The WAN controller node 126 communicates to the RPC module 142 a selection of links or routes 114 for packet transport to the second communication node 120. The stream-oriented transport layer protocol proxy module 140 utilizes the received selection of links or routes 114 and selects the SCTP association to be used for encapsulating the TCP packets from a plurality of SCTP associations 150 already established on the links or routes 114 communicated to said first communication node 118 by the WAN controller node 126. It can be seen therefore that the WAN controller node 126 selects the links or routes 114 to be communicated to the first communication node 118 prior to the first communication node 118 receiving the TCP packet connection 152 from the source PC 122.

When the first communication node 118 receives the TCP packet connection 152 from the source PC 122, the stream-oriented transport layer protocol proxy module 140 uses selected SCTP association 150 to signal the second communication node 120 whereby the second communication node 120, on being signaled, establishes a local TCP connection 154 with a destination node or destination device, e.g. destination PC 124, thereby forming a virtual TCP connection across the WAN 100 from the source PC 122 to the destination PC 124 whilst avoiding a need for a three-way TCP handshake across the WAN 100. Subsequently, but before the virtual TCP connection across the WAN 100 is fully established, it is possible to commence TCP payload packet transmission from the first communication node 118 to at least the second communication node 120.

Once TCP payload packets are received at the second communication node 120, said node 120 de-encapsulates the encapsulated TCP payload packets from the one or more streams of the selected SCTP association 150 and transmits said de-encapsulated TCP payload packets over the local TCP connection 154 to the destination PC 124.

When making a selection of links or routes 114 to send to the first communication node 118 and where status data for a link 114 is not available from the first communication node 118 or the link status is administratively down, the WAN controller node 126 may not include said link 114 in the selection of links or routes 114 for packet transport sent to the first communication node 118 or the WAN controller node 126 may include the link 114 but identify said link 114 as not being available for high priority packet transport.

When making a selection of links or routes 114 to send to the first communication node 118 and where one or more operational parameters for a link at the first communication node 118 exceed respective thresholds, the WAN controller node 126 may not include said link 114 in the selection of links or routes 114 for packet transport sent to the first communication node 118 or the WAN controller node 126 may include the link 114 but identify said link 114 as not being available for high priority packet transport. The respective thresholds may be defined by the WAN controller node 126 and may be dynamically adjusted by it.

Alternatively or additionally, when making a selection of links or routes 114 to send to the first communication node 118 and where one or more operational parameters for a link at the first communication node 118 exceed respective thresholds for a specific type of traffic, the WAN controller node 126 may not include said link 114 in the selection of links or routes 114 for packet transport for the specific type of traffic sent to the first communication node 118 or the WAN controller node 126 may include the link 114 but identify said link 114 as not being available for high priority packet transport for the specific type of traffic.

In any of the foregoing cases, the one or more operational parameters for a link 114 may comprise any one or any combination of jitter, latency and packet loss rate.

By way of example only, for real time traffic such as video and audio streaming traffic, the respective thresholds for the operational parameters for a link may comprise: jitter threshold 5 ms; latency threshold 100 ms; and packet loss rate 1%.

Also, by way of example only, for Transactional: Request-Reply Traffic (RPC, HTTP, DNS), the respective thresholds for the operational parameters for a link may comprise: jitter threshold 10 ms; latency threshold 150 ms; and packet loss rate 2%.

Also, by way of example only, for Bulk: Network Backup Traffic (FTP), the respective thresholds for the operational parameters for a link may comprise: jitter threshold 15 ms; latency threshold 200 ms; and packet loss rate 3%.

Figure 6:
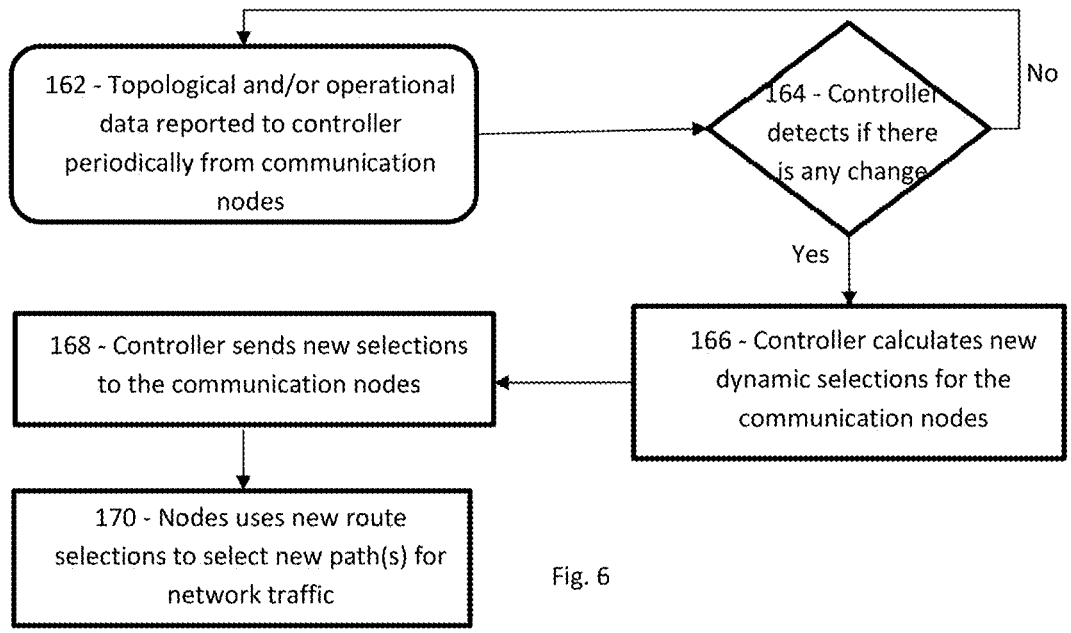
FIG. 6 is a flow diagram of a method for a controller node for a WAN configuration in accordance with the invention for determining respective dynamic selections of links or routes for communication nodes in the WAN.

It is preferred that the WAN controller node 126 makes dynamic selections of respective links or routes 114 for the communication nodes 118, 120 in the WAN 100. Referring now to FIG. 6, a method 160 for dynamic selection of respective links or routes 114 for the communication nodes 118, 120 is illustrated. A first initial step 162 represents the situation where the WAN controller node 126 has already received topological and/or operational data from the communication nodes 118, 120 in the WAN 100, has processed said data and has communicated respective selections to the communication nodes 118, 120. In a decision box 164, the WAN controller node 126 processes newly received topological and/or operational data from the communication nodes 118, 120 to determine if any changes have occurred since the receipt of already processed data. If, at decision box 164 it is determined that no changes have occurred in the newly received data compared to the last previously processed data, then the WAN controller node 126 maintains the previously determined respective selections of links or routes 114. However, if at decision box 164, the WAN controller node 126 determines that changes in the data have occurred, it calculates or determines at step 166 new respective selections of links or routes 114 for the communication nodes 118, 120. At step 168, the WAN controller node 126 sends the new respective selections of links or routes 114 to the appropriate communication nodes 118, 120. At step 170, the communication nodes 118, 120 use the new respective selections of links or routes 114 to select SCTP associations 150 already established on said new respective selections of links or routes 114 for payload packet transport to any destination nodes or devices 124 in the WAN 100.

Figure 7:
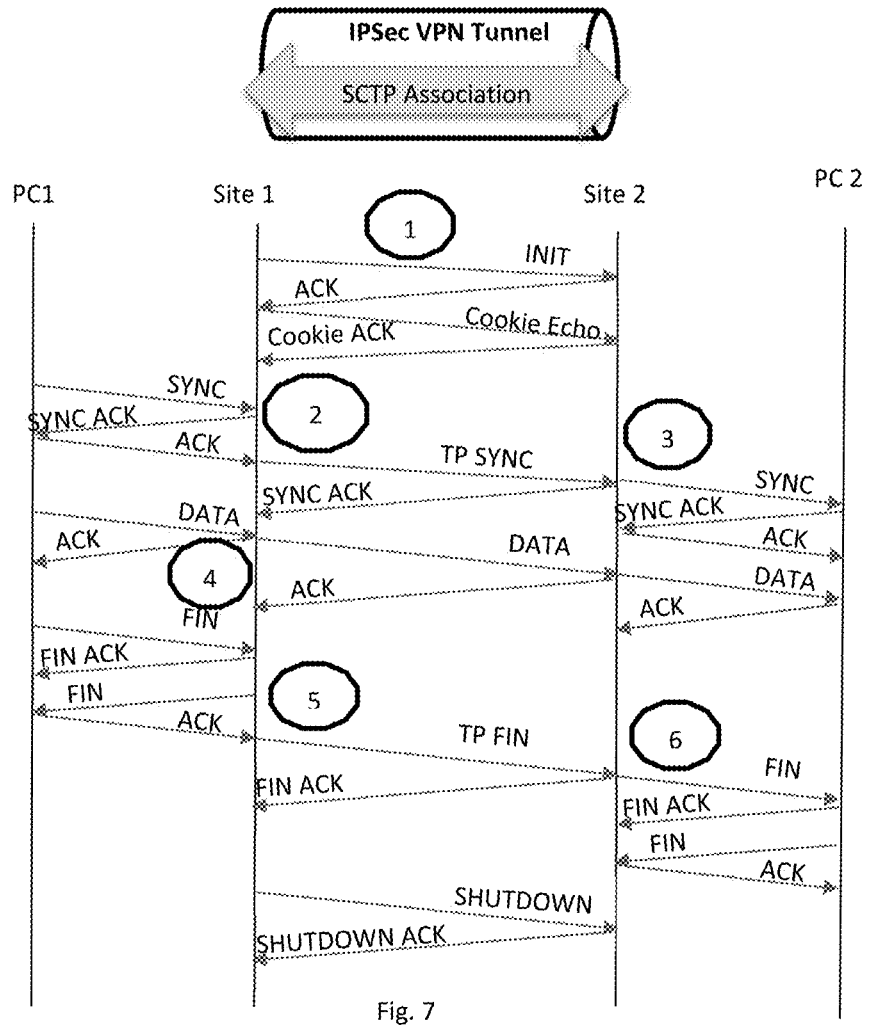
FIG. 7 is a signal diagram illustrating a method of reducing connection setup time across a WAN in accordance with the invention.

Referring to FIG. 7, the signal diagram of FIG. 7 illustrates how the method of the invention reduces connection setup time across the WAN 100.

In the example illustrated by FIG. 7, signal group 1 establishes an SCTP association 150 for each IPSec VPN tunnel connection 148.

At the first communication node 118, signal group 2 selects a SCTP association 150 from the routing table 147 (FIG. 4). The first communication node 118 may select the SCTP association 150 from the routing table 147 based on priority. The priorities of SCTP associations 150 in the routing table 147 are provided to the first communication node 118 by the WAN controller node 126 and may be provided at the same time as the WAN controller node 126 provides the respective selections of routes and links 114 to the communication nodes 118, 120. Also, as part of signal group 2, the first communication node 118 receives or accepts the incoming TCP packet connection 152 from the source PC 122 and then allocates one or more SCTP streams on the selected SCTP association 150 for the TCP packet connection 152 and records a mapping of the selected SCTP association 150 to the incoming TCP packet connection 152. Following this, the first communication node 118 sends a customized SCTP TP SYNC message to the second communication node 120 via the selected SCTP association 150. The mapping is conducted in the data plane and stored in the proxy module 140.

At the second communication node 120, signal group 3 commences with the second communication node 120 which, upon receiving the customized SCTP TP SYNC message from the first communication node 118 on the selected SCTP association 150, initiates a local TCP connection 154 to a destination node or destination device such as destination PC 124. The second communication node 120 records a mapping of the local TCP connection 154 to the selected SCTP association 150.

Signal group 4 commences with the first communication node 118 receiving TCP payload packets from the incoming TCP connection 152 and sending an ACK signal to the source PC 122. The first communication node 118 then transmits the received TCP payloads packets encapsulated within the one or more SCTP streams on the selected SCTP association 150 to the second communication node 120.

Signal group 5 commences with the source PC 122 closing the TCP connection 152 whereby the first communication node 118 sends a customized SCTP TP FIN message to the second communication node 120. The first communication node 118 then frees the one or more SCTP streams previously allocated for packet transmission to the second communication node 120 and clears the mapping from its routing table 147.

Signal group 6 commences with the second communication node 120 receiving the customized SCTP TP FIN message and, in response, closing the local TCP connection 154 to the destination PC 124. The second communication node 120 then clears the mapping for this connection.

It can be seen from FIG. 7 that the signaling illustrated thereby negates the need for a TCP three-way handshake process across the WAN 100 for setting up a payload packet connection and furthermore allows a payload packet connection across the WAN 100 to be initiated before the source PC 122 establishes the incoming (local) TCP connection 152 to the first communication node 118. Consequently, the setup time to establish a payload packet connection across the WAN 100 in accordance with the method of the invention is significantly less than the setup time using the TCP three-way handshake process across the WAN 100.

Figure 8:
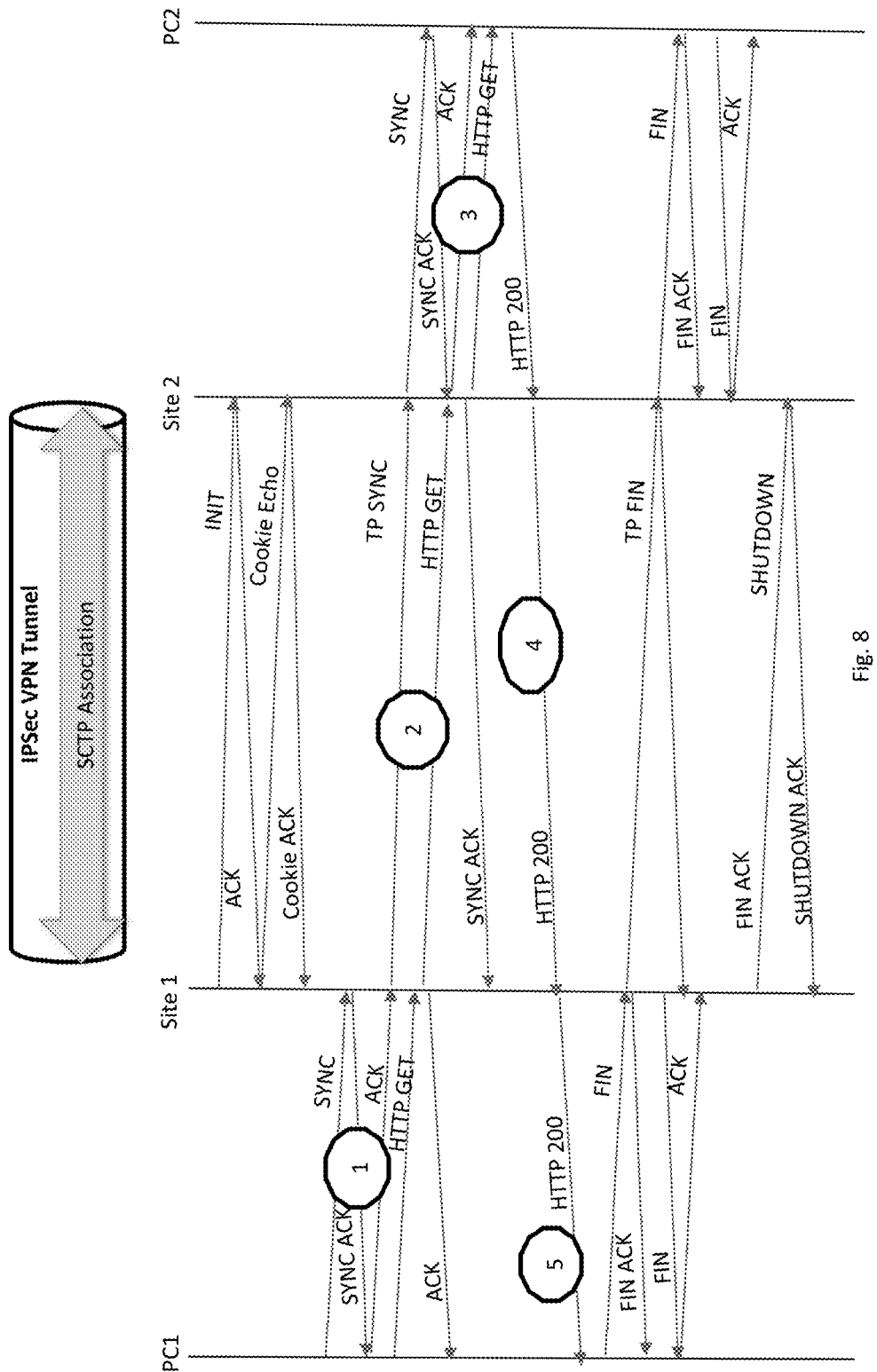
FIG. 8 is a signal diagram further illustrating the method of reducing connection setup time across a WAN in accordance with the invention.

FIG. 8 further illustrates how the method of the invention reduces connection setup time across the WAN 100. In the case where organization "site 1" 112 is located in Hong Kong and organization "site 2" 116 is located in San Francisco, the TCP connection setup time of signal group 1 in this example is about 0.221 ms. The customized SCTP TP SYNC message and HTTP Request Transfer Time over the IPSec VPN tunnel of signal group 2 is about 164 ms. The TCP Server Setup and HTTP response time of signal group 3 is about 0.237 ms. The HTTP Response Transfer Time over the IPSec VPN tunnel of signal group 4 is about 164 ms. The HTTP Result Transfer Time at source PC 122 is about 0.062 ms. Consequently, the sum of the connection setup times of signal groups 1 to 5 is about 328.52 ms instead of 640 ms as would be the case for a TCP three-way handshake over the same distance. The connection setup times of signal groups 1 to 5 of about 328.52 ms is the time needed for each signal from sending TCP packets with cURL to the server. It is important to note here that the TCP payload packets from the incoming TCP packet connection 152 can be transmitted immediately after the signal group 1 signals have been processed which is not the case where TCP signaling is used across the WAN 100 by way of the TCP three-way handshake process.

Figure 9:
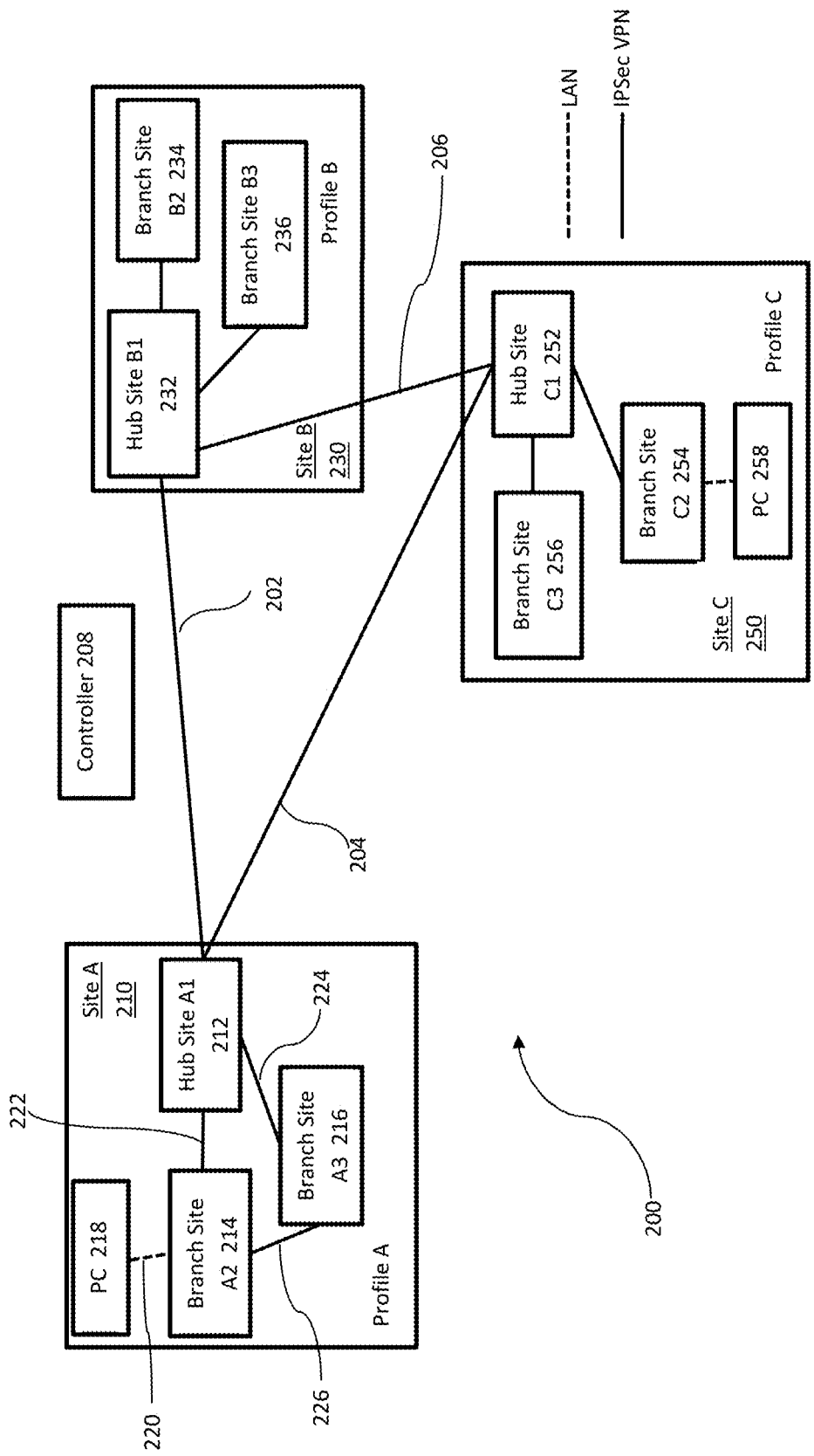
FIG. 9 is a schematic diagram of another embodiment of a WAN configuration in accordance with the invention.

Referring to FIG. 9, there is provided another embodiment of a WAN configuration in accordance with the invention. The WAN configuration shown in FIG. 9 is still a simplified configuration but is more presentative of a real-world WAN configuration than FIG. 2.

The WAN 200 of FIG. 9 comprises three geographically spaced apart sites comprising "site A" 210, "site B" 230 and "site C" 250. The sites 210, 230, 250 are interconnected by IPSec VPN tunnels 202, 204, 206 interconnecting respective hub-sites of the sites. Each site is also communicatively connected to a controller 208.

Site A 210 comprises a hub-site A1 212, a first branch site A2 214, a second branch site A3 216 and a plurality of communication devices presented by PC 218. The plurality of communication devices presented by PC 218 are connected to respective ones of the branch sites by local area network (LAN) connections 220. Each of the first and second branch sites 214, 216 is connected to the hub-site A1 212 by respective IPSec VPN tunnels 222, 224. The first second branch sites 214, 216 are interconnected by an IPSec VPN tunnel 226. The connection configuration of the hub-site A1 212 and the first second branch sites 214, 216 comprises a profile defined as "profile A" for organization site A 210.

Site B 230 comprises a hub-site B1 232, a first branch site B2 234, a second branch site B3 236 and a plurality of communication devices (not shown). Each of the first and second branch sites 234, 236 is connected to the hub-site B1 232 by respective IPSec VPN tunnels. The connection configuration of the hub-site B1 232 and the first second branch sites 234, 236 comprises a profile defined as "profile B" for organization site B 230.

Site C 250 comprises a hub-site C1 252, a first branch site C2 254, a second branch site C3 256 and a plurality of communication devices presented by PC 258. The plurality of communication devices presented by PC 258 are connected to respective ones of the branch sites by local area network (LAN) connections. Each of the first and second branch sites 254, 256 is connected to the hub-site C1 252 by respective IPSec VPN tunnels. The connection configuration of the hub-site C1 252 and the first second branch sites 254, 256 comprises a profile defined as "profile C" for organization site C 250.

An enhancement of the method of the invention includes using the controller 208 to assist all the communication nodes including nodes 212, 232, 252 with automatically establishing the IPSec VPN tunnel connections using an automatic VPN process based on the predefined configuration profiles A, B, C. In this case, the controller 208 and all the communication nodes including nodes 212, 232, 252 are enabled to implement an automatic VPN establishment process. The controller 208 may be arranged to receive the site configurations, i.e. the predefined configuration profiles A, B, C from a database (not shown) connected to the WAN 200 and to utilize the predefined configuration profiles A, B, C as well as the topological and/or operational parameters periodically reported by the communication nodes 212, 232, 252 to dynamically determine new respective selections of links or routes 114 for said communication nodes 212, 232, 252 and to transmit said newly dynamically determined respective selections of links or routes 114 to said communication nodes 212, 232, 252.

The WAN 200 may be arranged such that, on receiving new IPSec rules from the controller 208, the AutoVPN policy on each site will initiate establishment of the IPSec VPN tunnels with the other 'peer' sites and an Internet Key Exchange (IKE) process at each site will initiate an IKE procedure with the other 'peer' sites.

More generally, in the method of the invention, the proxy module of the communication node is arranged to receive the TCP connection setup request (TCP SYN) from the data plane of the same node, and to perform TCP end point functions on behalf of a TCP server in the TCP connection information in the connection setup request, including the server IP and port. The proxy function provides connection establishment, connection termination and reliable data transfer. On receiving TCP packets, the data plane finds a routing entry for the TCP destination address and records a mapping of the IPSec VPN tunnel, then forwards the TCP packets which need to be accelerated to a TP function or proxy module on the same node. On receiving the TCP connection setup request, the TP function uses the mapping of IPSec VPN tunnel and the selected SCTP association (connection) and allocates a free stream for this TCP connection then synchronizes the TCP connection setup request and the TCP connection information to a TP function or proxy module at the destination communication node.

On receiving the incoming TCP connection request (customized SCTP TP SYNC), the proxy module handles the subsequent steps for the TCP connection establishment on behalf of the original TCP client with the initiator of the TCP connection. For any incoming connection synchronized from the other proxy module, the method may include constructing a TCP connection setup request (SYN) using the TCP connection information received and handle the subsequent steps for the TCP connection establishment with the TCP server directly. The method provides reliable data transport for the TCP payloads when transmitting to another proxy module on another site over the WAN network. The reliable transport ensures the TCP data payload's integrity and order of sequence.

It will be understood from the foregoing that the method in accordance with the invention does not require the addition of new hardware into an already implemented WAN configuration. The method of the invention can be implemented in an existing WAN configuration by upgrading software, firmware, machine code, etc. on existing communication nodes and other nodes in the WAN. Consequently, the invention represents a low cost means of significantly upgrading an existing WAN configuration.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of transporting packets over a wide area network (WAN) in a communications network, the WAN comprising a plurality of interconnected communication nodes including at least a first communication node, a second communication node and a WAN controller node, the method comprising the steps of:
   establishing virtual private network (VPN) tunnel connections on communication links between some or all of the communication nodes comprising the WAN;
   using a non-stream-oriented transport layer protocol to establish a non-stream-oriented association for each VPN tunnel connection; and,
   on receiving a packet connection comprising a stream-oriented packet connection or a Transport Connection Protocol (TCP) packet connection from a source device at said first communication node, encapsulating packets from said packet connection into one or more non-stream-oriented associations between the first communication node and the second communication node to thereby transport said packets from the source device to the second communication node;
   wherein the WAN controller node communicates to the first communication node a selection of links or routes for packet transport to the second communication node;
   wherein the first communication node selects the one or more non-stream-oriented associations for encapsulating packets into a plurality of non-stream-oriented associations established on the links or routes communicated to said first node by the WAN controller node; and wherein, when the first communication node receives the stream-oriented packet connection from the source device, the first communication node uses one of the one or more selected non-stream-oriented associations to signal the second communication node whereby the second communication node, on being signaled, establishes a local stream-oriented connection with a destination node or a destination device thereby forming a virtual stream-oriented connection across the WAN from the source device to the destination node or the destination device whilst avoiding a need for a three-way stream-oriented handshake across the WAN between the source device and the destination node or the destination device.

2. The method of claim 1, wherein the non-stream-oriented transport layer protocol comprises a message-oriented transport layer protocol.

3. The method of claim 2, wherein the message-oriented transport layer protocol comprises a Stream Control Transmission Protocol (SCTP) and optionally wherein each non-stream-oriented SCTP association is encrypted in an Internet Protocol Security (IPSec) VPN tunnel.

4. The method of claim 1, wherein the WAN controller node selects said links or routes based on one or more topological and/or one or more operational parameters of the WAN.

5. The method of claim 4, wherein the one or more topological and/or one or more operational parameters of the WAN comprise any one or any combination of WAN communication node configuration data, WAN communication node status data, WAN link configuration data, WAN link status data, and WAN link quality data.

6. The method of claim 4, wherein the WAN controller node receives topological and/or operational parameter data from each of the WAN communication nodes and processes said data to provide each communication node with a respective dynamic selection of links or routes for packet transport.

7. The method of claim 6, wherein, when the WAN controller node detects a change in the received topological and/or operational parameter data from the WAN communication nodes, the WAN controller node determines new respective dynamic selections of links or routes for packet transport for the communication nodes.

8. The method of claim 1, wherein the WAN controller node selects the links or routes to be communicated to the first communication node prior to the first communication node receiving the packet connection from the source device.

9. The method of claim 1, wherein the second communication node de-encapsulates the encapsulated stream-oriented packets from the one or more selected non-stream-oriented associations and transmits said de-encapsulated stream-oriented packets over the local stream-oriented connection between the second communication node and the destination node or destination device.

10. The method of claim 1, wherein the WAN controller node assists the communication nodes with establishing the VPN tunnel connections using an automatic VPN process based on predefined profiles.

11. The method of claim 10, wherein the WAN comprises at least two organization sites, each organization site comprising a plurality of communication nodes, the plurality of communication nodes at each organization site comprising a hub-site node connected to hub-site nodes at other organization sites and branch-site nodes, each branch-site node connected to a hub-site node and/or to another branch-site node at its organization site, wherein the predefined profiles comprise the connection relationships between the respective hub-site nodes and their branch-site nodes at said organization sites.

12. The method of claim 1, wherein, if link status data is not available from a communication node for any link associated with said communication node, then the link will not be included in the selection of links or routes for packet transport sent to that communication node from the WAN controller node or the link will not be included in the selection of links or routes for high priority packet transport sent to that communication node from the WAN controller node.

13. The method of claim 1, wherein, if one or more operational parameters for a link at a communication node exceed their respective thresholds, then the link will not be included in the selection of links or routes for packet transport sent to that communication node from the WAN controller node or the link will not be included in the selection of links or routes for high priority packet transport sent to that communication node from the WAN controller node.

14. The method of claim 13, wherein the one or more operational parameters for a link comprise any one or any combination of jitter, latency and packet loss rate.

15. The method of claim 1, wherein, if one or more operational parameters for a link at a communication node exceed their respective thresholds for a type of traffic, then the link will not be included in the selection of links or routes for packet transport sent to that communication node from the WAN controller node for that type of traffic or the link will not be included in the selection of links or routes for high priority packet transport sent to that communication node from the WAN controller node for that type of traffic.

16. The method of claim 15, wherein the one or more operational parameters for a link comprise any one or any combination of jitter, latency and packet loss rate.

17. A communication node for a wide area network (WAN) in a communications network, the WAN comprising a plurality of interconnected such nodes in the communications network, the communication node comprising:

a VPN module configured to establish VPN tunnel connections on communication links between said communication node and some or all of the other such nodes comprising the WAN;

a non-stream-oriented transport layer protocol module configured to establish a non-stream-oriented association for each VPN tunnel connection at said communication node;

a stream-oriented transport layer protocol proxy module configured to, on receiving at said communication node a stream-oriented connection from a source device, encapsulate packets from said stream-oriented connection into one or more non-stream-oriented associations between said communication node and a destination node to thereby transport said packets from the source device to the destination node;

a remote procedure call (RPC) module configured to receive from a WAN controller node a selection of links or routes for packet transport from said communication node to other such nodes comprising the WAN, wherein the stream-oriented transport layer protocol proxy module selects the one or more non-stream-oriented associations for encapsulating packets into a plurality of non-stream-oriented associations established on the links or routes communicated to said communication node by the WAN controller node; and wherein, when said communication node receives the stream-oriented packet connection from the source device, the communication node uses one of the one or more selected non-stream-oriented associations to signal one of the other such nodes to establish a local stream-oriented connection with a destination node or a destination device thereby forming a virtual stream-oriented connection across the WAN from the source device to the destination node or the destination device whilst avoiding a need for a three-way stream-oriented handshake across the WAN between the source device and the destination node or the destination device.

18. A method, comprising:

pre-configuring a plurality of non-stream-oriented transport layer protocol associations between a plurality of interconnected communication nodes in a wide area network (WAN), the non-stream-oriented transport layer protocol comprising a message-oriented transport layer protocol or a Stream Control Transmission Protocol (SCTP);

receiving stream-oriented transport layer protocol packets from a network device, the packets being intended for a destination node or a destination device;

encapsulating the packets into non-stream-oriented transport layer protocol payloads for one or more selected non-stream-oriented transport layer protocol associations; and transmitting the non-stream-oriented transport layer protocol payloads across the WAN in one or more streams on the one or more selected non-stream-oriented transport layer protocol associations to the destination node or device;

wherein the selected one or more non-stream-oriented transport layer protocol associations are selected based on one or more topological and/or one or more operational parameters of the WAN; and wherein, when the stream-oriented transport layer protocol packets are received from the network device, a first communication node of the plurality of interconnected communication nodes uses one of the one or more selected non-stream-oriented associations to signal a second communication node whereby the second communication node, on being signaled, establishes a local stream-oriented connection with the destination node or the destination device thereby forming a virtual stream-oriented connection across the WAN from the network device to the destination node or the destination device whilst avoiding a need for a three-way stream-oriented handshake across the WAN between the network device and the destination node or the destination device.

19. A method of transporting packets over a wide area network (WAN) in a communications network, the WAN comprising a plurality of interconnected communication nodes including at least a first communication node, a second communication node and a WAN controller node, the method comprising the steps of:

establishing virtual private network (VPN) tunnel connections on communication links between some or all of the communication nodes comprising the WAN;

using a non-stream-oriented transport layer protocol to establish a non-stream-oriented association for each VPN tunnel connection; and, on receiving a packet connection from a source device at said first communication node, encapsulating packets from said packet connection into one or more non-stream-oriented associations between the first communication node and the second communication node to thereby transport said packets from the source device to the second communication node;

wherein the WAN controller node communicates to the first communication node a selection of links or routes for packet transport to the second communication node;

wherein the first communication node selects the one or more non-stream-oriented associations for encapsulating packets into a plurality of non-stream-oriented associations established on the links or routes communicated to said first node by the WAN controller node;

wherein the WAN controller node assists the communication nodes with establishing the VPN tunnel connections using an automatic VPN process based on pre-defined profiles; and wherein the WAN comprises at least two organization sites, each organization site comprising a plurality of communication nodes, the plurality of communication nodes at each organization site comprising a hub-site node connected to hub-site nodes at other organization sites and branch-site nodes, each branch-site node connected to a hub-site node and/or to another branch-site node at its organization site, wherein the predefined profiles comprise the connection relationships between the respective hub-site nodes and their branch-site nodes at said organization sites.

20. A communication node for a wide area network (WAN) in a communications network, the WAN comprising a plurality of interconnected nodes in the communications network, the communication node comprising:

a VPN module configured to establish VPN tunnel connections on communication links between said communication node and some or all of the other communication nodes comprising the WAN;

a non-stream-oriented transport layer protocol module configured to establish a non-stream-oriented association for each VPN tunnel connection at said communication node;

a stream-oriented transport layer protocol proxy module configured to, on receiving at said communication node a stream-oriented connection from a source device, encapsulate packets from said stream-oriented connection into one or more non-stream-oriented associations between said communication node and a destination node to thereby transport said packets from the source device to the destination node;

a remote procedure call (RPC) module configured to receive from a WAN controller node a selection of links or routes for packet transport from said communication node to other communication nodes comprising the WAN, wherein the stream-oriented transport layer protocol proxy module selects the one or more non-stream-oriented associations for encapsulating packets into a plurality of non-stream-oriented associations established on the links or routes communicated to said communication node by the WAN controller node;

wherein the WAN controller node assists the communication nodes with establishing the VPN tunnel connections using an automatic VPN process based on pre-defined profiles; and wherein the WAN comprises at least two organization sites, each organization site comprising a plurality of communication nodes, the plurality of communication nodes at each organization site comprising a hub-site node connected to hub-site nodes at other organization sites and branch-site nodes, each branch-site node connected to a hub-site node and/or to another branch-site node at its organization site, wherein the predefined profiles comprise the connection relationships between the respective hub-site nodes and their branch-site nodes at said organization sites.

21. A method, comprising:

pre-configuring a plurality of non-stream-oriented transport layer protocol associations between a plurality of interconnected communication nodes in a wide area network (WAN), the non-stream-oriented transport layer protocol comprising a message-oriented transport layer protocol or a Stream Control Transmission Protocol (SCTP);

establishing virtual private network (VPN) tunnel connections on communication links between some or all of the communication nodes comprising the WAN;

receiving stream-oriented transport layer protocol packets from a network device, the packets being intended for a destination node or a destination device;

encapsulating the packets into non-stream-oriented transport layer protocol payloads for one or more selected non-stream-oriented transport layer protocol associations; and transmitting the non-stream-oriented transport layer protocol payloads across the WAN in one or more streams on the one or more selected non-stream-oriented transport layer protocol associations to the destination node or device;

wherein the selected one or more non-stream-oriented transport layer protocol associations are selected based on one or more topological and/or one or more operational parameters of the WAN;

wherein the WAN controller node assists the communication nodes with establishing the VPN tunnel connections using an automatic VPN process based on predefined profiles; and wherein the WAN comprises at least two organization sites, each organization site comprising a plurality of communication nodes, the plurality of communication nodes at each organization site comprising a hub-site node connected to hub-site nodes at other organization sites and branch-site nodes, each branch-site node connected to a hub-site node and/or to another branch-site node at its organization site, wherein the predefined profiles comprise the connection relationships between the respective hub-site nodes and their branch-site nodes at said organization sites.

* * * * *